(12) United States Patent
Yoon (10) Patent No.: US 12,308,409 B2
(45) Date of Patent: May 20, 2025

(54) COOLING STRUCTURE OF BATTERY MODULE FOR ELECTRIC VEHICLE

(71) Applicant: HYUNDAI MOBIS Co., Ltd., Seoul (KR)

(72) Inventor: Tae Yul Yoon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 592 days.

(21) Appl. No.: 17/559,079

(22) Filed: Dec. 22, 2021

(65) Prior Publication Data

US 2022/0209328 A1 Jun. 30, 2022

(30) Foreign Application Priority Data

Dec. 24, 2020 (KR) ........................ 10-2020-0183872

(51) Int. Cl.
| | |
|---|---|
| *H01M 10/6556* | (2014.01) |
| *B60L 50/64* | (2019.01) |
| *B60L 58/26* | (2019.01) |
| *H01M 10/613* | (2014.01) |
| *H01M 10/625* | (2014.01) |
| *H01M 10/653* | (2014.01) |

(52) U.S. Cl.
CPC ......... *H01M 10/6556* (2015.04); *B60L 50/64* (2019.02); *B60L 58/26* (2019.02); *H01M 10/613* (2015.04); *H01M 10/625* (2015.04); *H01M 10/653* (2015.04); *H01M 2220/20* (2013.01)

(58) Field of Classification Search
CPC ........... H01M 10/6556; H01M 10/613; H01M 10/625; H01M 10/653; H01M 2220/20; H01M 10/617; H01M 10/6554; H01M 50/204; B60L 50/64; B60L 58/26; B60K 1/00; B60K 2001/005; B60Y 2200/91; B60Y 2306/05; Y02E 60/10; Y02T 10/70
See application file for complete search history.

(56) References Cited

U.S. PATENT DOCUMENTS

| | | | |
|---|---|---|---|
| 2016/0322679 | A1* | 11/2016 | Landerer ............. H01M 10/613 |
| 2018/0358666 | A1* | 12/2018 | Siering ................. H01M 50/24 |
| 2018/0375179 | A1* | 12/2018 | King ................. H01M 10/6555 |
| 2019/0348726 | A1* | 11/2019 | Marpu ................. H01M 50/227 |
| 2020/0243928 | A1* | 7/2020 | Schmidt ............. H01M 10/655 |
| 2020/0343602 | A1* | 10/2020 | Lee ..................... H01M 50/204 |

* cited by examiner

*Primary Examiner* — Muhammad S Siddiquee
(74) *Attorney, Agent, or Firm* — NSIP Law (57) ABSTRACT

A cooling structure of a battery module for an electric vehicle includes: a battery cell; a heat transfer agent disposed under the battery cell; a cooling path member disposed under the heat transfer agent to be in contact with the heat transfer agent; and a cover member covering the battery cell. A lower portion of the battery cell is in direct contact with the heat transfer agent.

12 Claims, 6 Drawing Sheets

| | 1 | CONVENTIONAL TECHNOLOGY |
|---|---|---|
| TEMPERATURE DISTRIBUTION (°C) | | 37.7 \| 42.3 \| 41.4 \| 41.9 \| 42.6 \| 42.6 \| 40 \| 43 \| 40.6 <br> ↑OUTER CELL  INNER CELL |
| EXPERIMENT RESULT | | $T_{max}$: 45.9, $T_{min}$: 37.7, $\Delta T$: 8.2 |
| CONCLUSION | | TEMPERATURE DIFFERENCE BETWEEN OUTER CELL AND INNER CELL IS IMPROVED BY ABOUT 19% FROM 8.2 °C to 6.7 °C. |

FIG. 5B

| | 2 | PRESENT INVENTION |
|---|---|---|
| TEMPERATURE DISTRIBUTION (°C) | | 38.9 \| 42.2 \| 41.3 \| 41.9 \| 42.4 \| 42.2 \| 41.8 \| 43.2 \| 40.7 <br> ↑ <br> OUTER CELL      INNER CELL |
| EXPERIMENT RESULT | | $T_{max}$: 45.6, $T_{min}$: 38.9, $\Delta T$: 6.7 |
| CONCLUSION | | TEMPERATURE DIFFERENCE BETWEEN OUTER CELL AND INNER CELL IS IMPROVED BY ABOUT 19% FROM 8.2 °C to 6.7 °C. |

COOLING STRUCTURE OF BATTERY MODULE FOR ELECTRIC VEHICLE

CROSS-REFERENCE TO RELATED APPLICATIONS

This application claims the benefit under 35 USC § 119(a) of Korean Patent Application No. 10-2020-0183872, filed on Dec. 24, 2020 in the Korean Intellectual Property Office, the entire disclosure of which is incorporated herein by reference for all purposes.

BACKGROUND

1. Field

The disclosure herein relates to a cooling structure of a battery module for an electric vehicle, and more particularly, to a cooling structure of a battery module for an electric vehicle which may improve cooling efficiency of a battery used in an electric vehicle.

2. Discussion of Related Art

Heat dissipation of conventional battery systems for electric vehicles is performed through indirect cooling methods, and battery modules and cooling path members for the heat dissipation are applied to the conventional battery systems.

Figure 1:
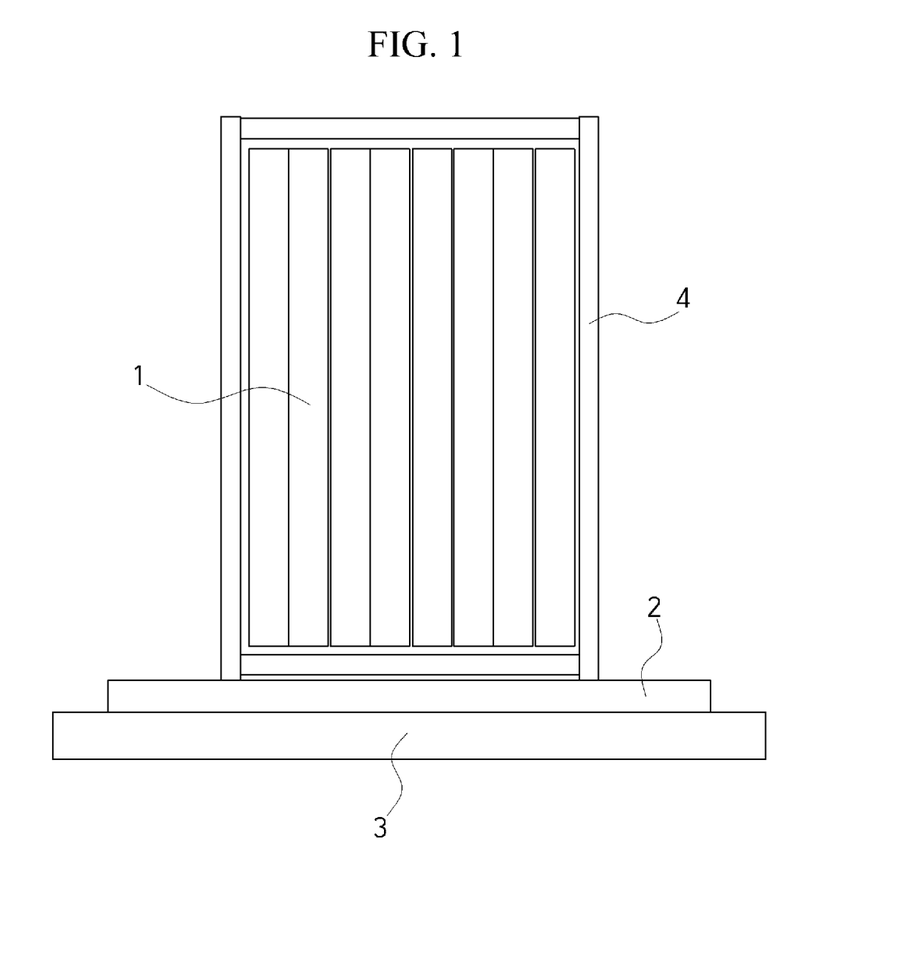
FIG. 1 is a cross-sectional view illustrating a conventional cooling structure of a battery module for an electric vehicle.

FIG. 1 is a cross-sectional view illustrating a conventional cooling structure of a battery module for an electric vehicle.

As illustrated in FIG. 1, a battery module includes a plurality of battery cells 1, and a cover member 4 surrounds a circumference of the battery cells 1.

The cover member 4 surrounds not only upper portions and side surfaces but also lower portions of the battery cells 1.

In addition, a cooling path member 3 is disposed under the cover member 4.

A heat transfer agent 2 formed of an insulating material is applied between the battery cells 1 and the cooling path member 3, and more specifically, between a lower surface of the cover member 4 and the cooling path member 3 in order to block a battery leakage current.

Conventionally, since the cover member 4 surrounds the entire battery cells 1 as described above, the battery cells 1 are not in direct contact with the heat transfer agent 2 and are connected to the heat transfer agent 2 through a lower portion of the cover member 4.

In addition, an entire upper surface of the cooling path member 3 is formed in a flat shape, and the heat transfer agent 2 is applied to an entire region of the flat upper surface of the cooling path member 3.

In this structure, since a gap by which a lower end of the battery cell 1 is spaced apart from the upper surface of the cooling path member 3 is large, there is a problem of lowering heat transfer efficiency.

In addition, since the lower end of the battery cell 1 faces the upper surface of the cooling path member 3 in a flat surface versus a flat surface manner, there is a limitation to optimizing a heat radiation area for satisfying the heat dissipation performance of the battery system, and there are problems of increasing a temperature difference between inner cells disposed inside the battery cell 1 and outer cells disposed at an outer side thereof, and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a cooling structure of a battery module for an electric vehicle includes: a battery cell; a heat transfer agent disposed under the battery cell; a cooling path member disposed under the heat transfer agent to be in contact with the heat transfer agent; and a cover member covering the battery cell. A lower portion of the battery cell is in direct contact with the heat transfer agent.

The battery cell may be connected to the cooling path member through the heat transfer agent.

The cover member may be formed in a shape having an open lower portion. The battery cell and the heat transfer agent may be disposed inside the cover member. A lower end of the cover member may be in contact with an upper surface of the cooling path member.

In another general aspect, a cooling structure of a battery module for an electric vehicle includes: a battery cell; a heat transfer agent disposed under the battery cell; a cooling path member disposed under the heat transfer agent to be in contact with the heat transfer agent; and a cover member covering the battery cell. The cooling path member includes an upper path member disposed under the battery cell, inside the cover member.

An upper surface of the heat transfer agent may be in contact with a lower portion of the battery cell. A lower surface of the heat transfer agent may be in contact with an upper portion of the upper path member.

The cover member may be formed in a shape having an open lower portion. The battery cell, the heat transfer agent, and the upper path member may be disposed inside the cover member.

The cooling path member may further include: a lower path member having an upper surface in contact with a lower end of the cover member; and an inclined portion inclined upward from the lower path member. The upper path member may be disposed above the lower path member and the inclined portion to be in contact with the heat transfer agent. The inclined portion and the upper path member may be disposed inside the cover member.

The inclined portion may have an inclination angle in a range of 140 degrees to 160 degrees with respect to the lower path member, and an inclination angle in a range of 140 degrees to 160 degrees with respect to the upper path member.

An entire length of the heat transfer agent in a horizontal direction may be shorter than an entire length of the battery cell in the horizontal direction.

The battery cell may include: inner cells; and outer cells disposed outside the inner cells. Each of the outer cells may include an inner part in contact with a respective inner cell, among the inner cells, and an outer part facing the cover member. The heat transfer agent may be in contact with a lower portion of each of the inner cells and a lower portion of the inner part of each of the outer cells, and may not be in contact with a lower portion of the outer part each of the outer cells.

The lower portion of the outer part of each of the outer cells may be spaced apart from an upper surface of the cooling path member.

The cooling path member may further include: a lower path member having an upper surface is in contact with a lower end of the cover member; and an inclined portion inclined upward from the lower path member. The upper path member may be disposed above the lower path member and the inclined portion to be in contact with the heat transfer agent. The inclined portion and the upper path member may be disposed inside the cover member. The outer part of an outer cell, among the outer cells, may face the inclined portion in a state in which the outer part of the outer cell is upwardly spaced apart from the inclined portion.

A length of the outer part of an outer cell, among the outer cells, in a horizontal direction may be 13% to 61% of an entire width of the outer cell.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Embodiments of the present invention are provided to more completely describe the present invention to those skilled in the art, the embodiments described below will be changed into various different forms, and the scope of the present invention is not limited to the following embodiments. Further, the embodiments are provided to make the present invention more complete and true and to convey the spirit of the present invention to those skilled in the art. In addition, in the following drawings, components are exaggerated for convenience and clarity of descriptions, and components that are the same are referred to by the same reference numerals. As used in the present specification, the term "and/or" includes any and all combinations of the associated listed items.

The terms used herein are used only to describe the specific embodiments and are not to limit the present invention.

Unless the context clearly indicates otherwise, the singular forms described in the specification include the plural forms. In addition, the terms "comprise" and "comprising," when used herein, specify some stated shapes, numbers, steps, operations, members, elements, and/or presence of groups thereof but do not preclude one or more other shapes, numbers, operations, members, elements, and/or presence or addition of groups thereof.

Hereinafter, exemplary embodiments of the present invention will be described in detail with reference to the accompanying drawings.

Figure 2:
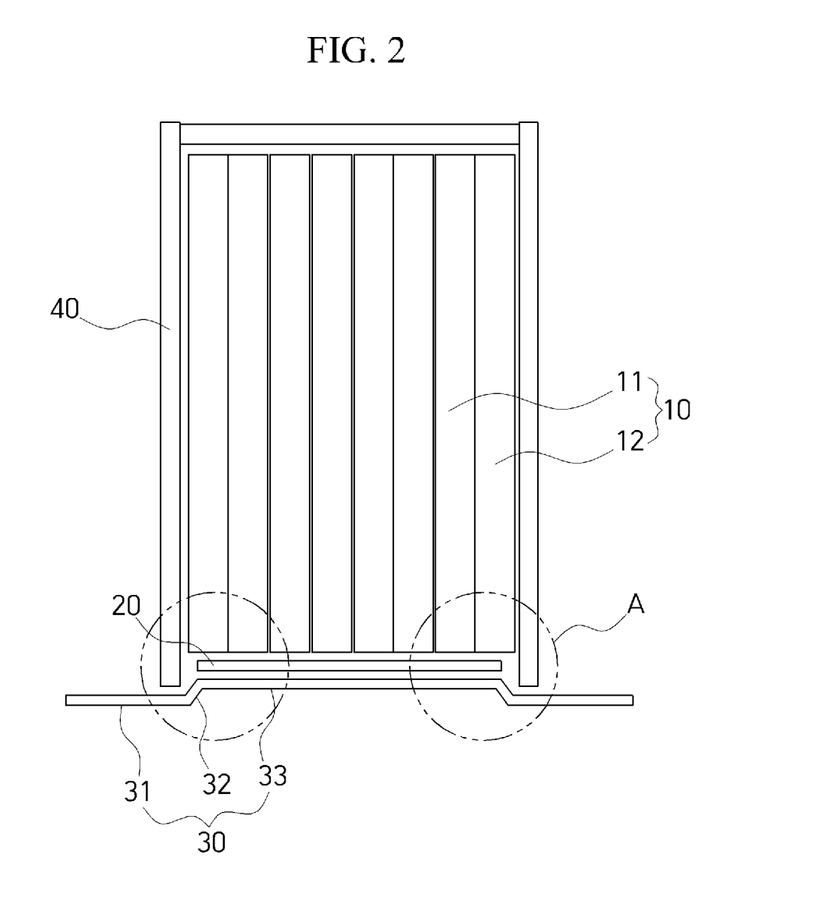
FIG. 2 is a cross-sectional view illustrating a cooling structure of a battery module for an electric vehicle according to an embodiment of the present invention.
Figure 3:
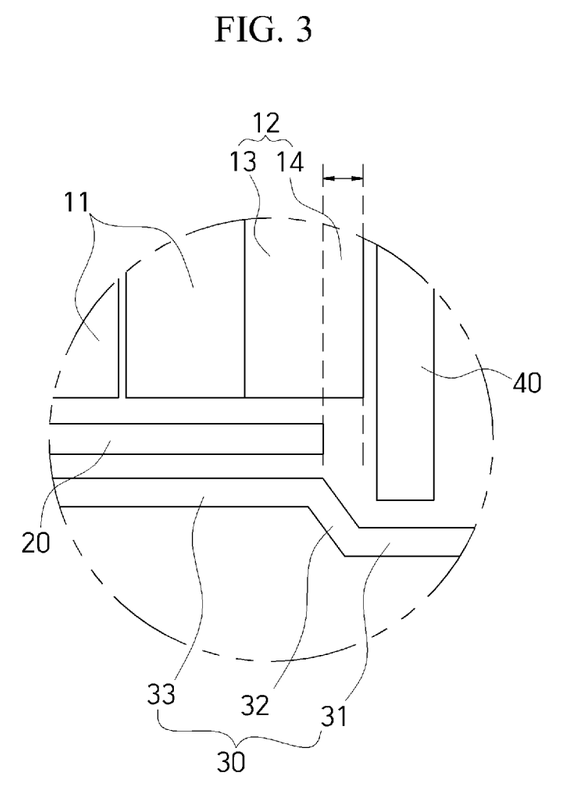
FIG. 3 is an enlarged cross-sectional view illustrating region A of FIG. 2.
Figure 4:
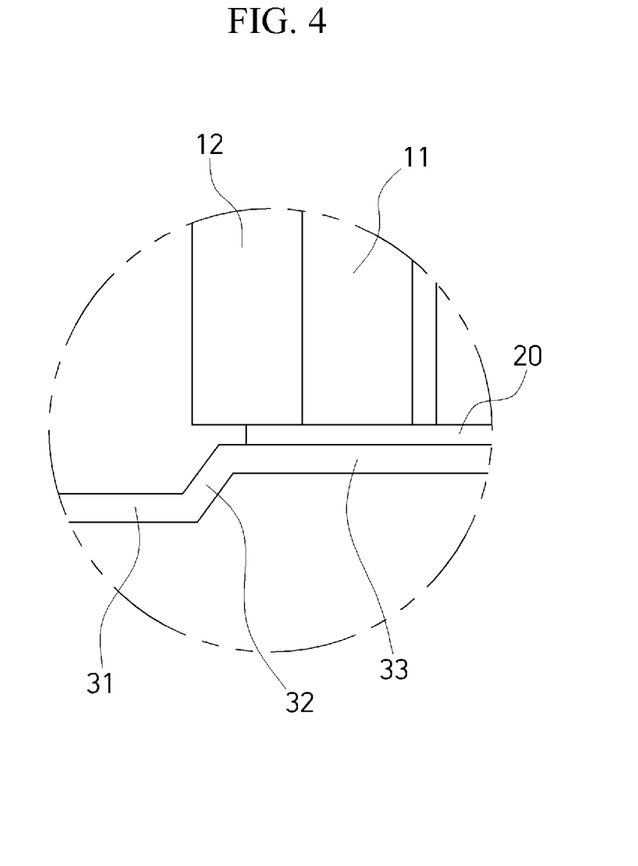
FIG. 4 is a partially enlarged cross-sectional view illustrating the cooling structure of a battery module for an electric vehicle according to the embodiment of the present invention.

As illustrated in FIGS. 2 to 4, a cooling structure of a battery module for an electric vehicle of the present invention includes battery cells 10, a heat transfer agent 20, a cooling path member 30, and a cover member 40.

The plurality of battery cells 10 are disposed in a horizontal direction.

In the present embodiment, the battery cells 10 include a plurality of inner cells 11 and a plurality of outer cells 12 disposed outside the inner cell 11.

As drawn with dotted lines in FIG. 3, the outer cell 12 is divided into an inner part 13 in contact with the inner cell 11 and an outer part 14 facing the cover member 40.

A length of the outer part 14 in the horizontal direction may be 13 to 61% of an entire width of the outer cell 12.

A material and a shape of the heat transfer agent 20 are identical or similar to those of a conventional heat transfer agent, and the heat transfer agent 20 is disposed under the battery cell 10.

The heat transfer agent 20 serves to block a battery leakage current.

In the present invention, a lower portion of the battery cell 10 is in direct contact with the heat transfer agent 20 disposed thereunder.

The cooling path member 30 is disposed under the heat transfer agent 20 to be in contact therewith and serve to cool the battery cell 10 by radiating heat, which is transferred through the heat transfer agent 20, of the battery cell 10.

That is, the battery cell 10 is connected to the cooling path member 30 through the heat transfer agent 20 in direct contact with the battery cell 10 to radiate the heat thereof.

In the present invention, the cooling path member 30 includes a lower path member 31, an inclined portion 32, and an upper path member 33.

The lower path member 31 is a portion constituting an outer portion of the cooling path member 30 and is disposed at a lower position than the upper path member 33, and an upper surface of the lower path member 31 is in contact with a lower end of the cover member 40.

That is, the lower end of the cover member 40, which covers the battery cell 10, is in contact with the upper surface of the lower path member 31 of the cooling path member 30.

The inclined portion 32 is formed to be inclined upward from the lower path member 31.

In this case, as illustrated in FIG. 4, the inclined portion 32 may be inclined at an inclination angle of 140 to 160 degrees with respect to the lower path member 31.

The upper path member 33 is formed to be disposed at a higher position in an upward direction than the lower path member 31 and the inclined portion 32, and an upper surface of the upper path member 33 is in contact with a lower surface of the heat transfer agent 20.

In this case, as illustrated in FIG. 4, the inclined portion 32 may be inclined at an inclination angle of 140 to 160 degrees with respect to the upper path member 33.

Due to a shape and a structure of the cooling path member 30, the upper path member 33 has a convex shape protruding upward, and thus a gap between a lower end of the battery cell 10 and the upper path member 33 may be decreased so that the heat transfer performance of transferring heat of the battery cell 10 to the cooling path member 30 may be maximized.

In addition, an upper surface of the heat transfer agent 20 is in contact with the lower portion of the battery cell 10, and the lower surface of the heat transfer agent 20 is in contact with an entire upper portion of the upper path member 33.

Since the heat transfer agent 20 is applied on the entire upper surface of the upper path member 33, withstand voltage performance may be secured, and an area at which the heat transfer agent 20 and the outer cell 12 are in contact with each other may be optimized due to the shape of the upper path member 33 at the same time.

The cover member 40 covers the battery cell 10.

The cover member 40 is formed in a shape of which a lower portion is open.

The battery cell 10 and the heat transfer agent 20 are disposed inside the cover member 40, and the lower end of the cover member 40 is in contact with an upper surface of the cooling path member 30.

More specifically, as the upper path member 33 of the cooling path member 30 and the inclined portion 32 in addition to the battery cell 10 and the heat transfer agent 20 are disposed inside the cover member 40, the upper path member 33 is disposed under the battery cell 10 inside the cover member 40.

Meanwhile, an entire length of the heat transfer agent 20 in the horizontal direction is shorter than an entire length of the battery cell 10 in the horizontal direction.

The heat transfer agent 20 is in contact with a lower portion of the inner cell 11 and a lower portion of the inner part 13 of the outer cell 12 and is not in contact with a lower portion of the outer part 14 of the outer cell 12.

In addition, the lower portion of the outer part 14 of the outer cell 12 is spaced apart from the upper surface of the cooling path member 30.

In this case, the outer part 14 of the outer cell 12 faces the inclined portion 32 in a state in which the outer part 14 of the outer cell 12 is upwardly spaced apart from the inclined portion 32.

Accordingly, the outer part 14 of the outer cell 12 is not in contact with the heat transfer agent 20 and is exposed to air present between the outer part 14 of the outer cell 12 and the inclined portion 32.

Due to a non-contact structure between the heat transfer agent 20 and the battery cell 10, that is, non-contact between the heat transfer agent 20 and the outer part 14 of the outer cell 12, an amount of heat transferred to the outer cell 12 is decreased, and thus a temperature difference between the outer cell 12 which is over cooled according to an ambient temperature and the inner cell 11 which is not affected by the ambient temperature may be reduced.

Figure 5A:
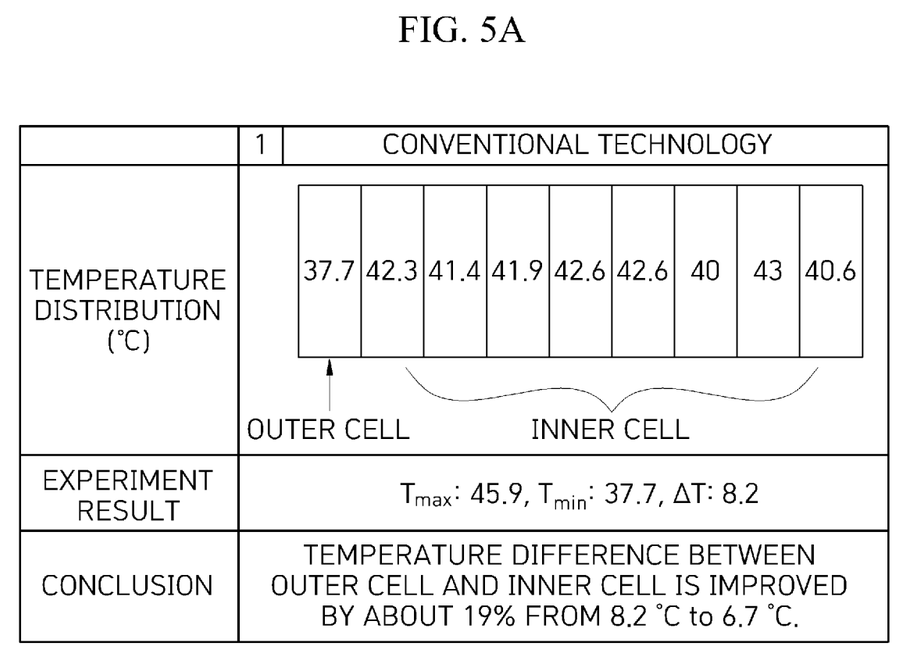
FIGS. 5A and 5B show comparative explanatory views for describing a temperature distribution of the conventional cooling structure of a battery module for an electric vehicle and a temperature distribution of the cooling structure of a battery module for an electric vehicle according to the embodiment of the present invention.
Figure 5B:
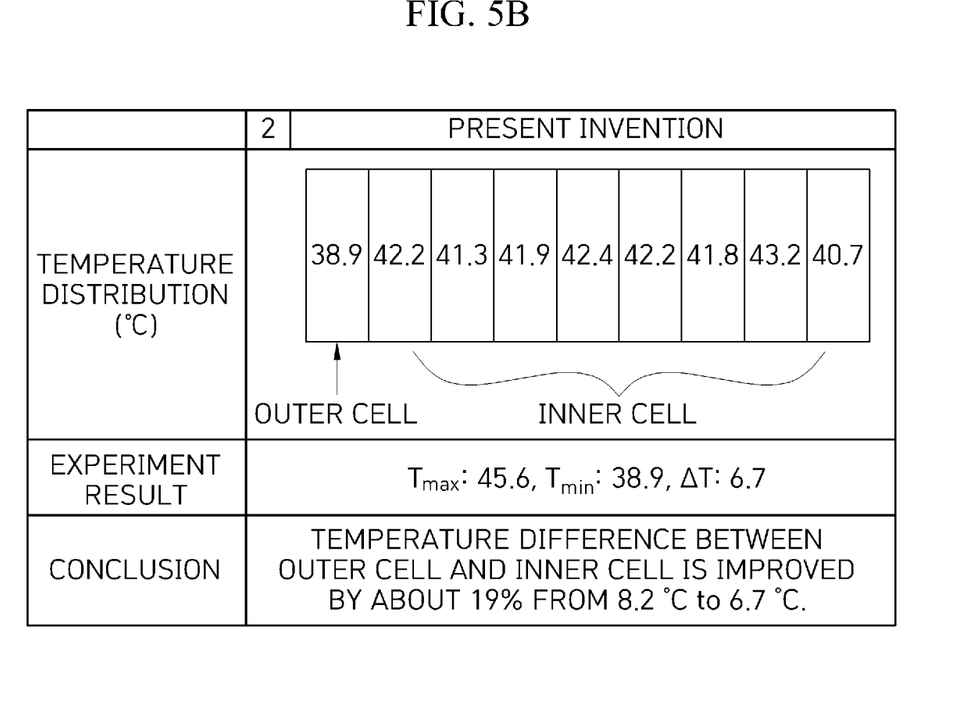

FIGS. 5A and 5B show comparative explanatory views for describing a temperature distribution of the conventional cooling structure of a battery module for an electric vehicle and a temperature distribution of the cooling structure of the battery module for an electric vehicle according to the embodiment of the present invention.

In the conventional case, as illustrated in FIG. 5A, a temperature difference between an inner cell 11 and an outer cell 12 is 8.2 degrees.

However, in the case of the present invention, as illustrated in FIG. 5B, a temperature difference between the inner cell 11 and the outer cell 12 is 6.7 degrees, and thus the temperature difference is reduced by about 19% with reference to the conventional case.

From this content, it may be seen that the temperature difference between the outer cell 12 and the inner cell 11 can be reduced due to the structure of the present invention.

As described above, since the present invention allows a gap between the lower end of the battery cell 10 and the upper surface of the cooling path member 30 to be decreased so as to improve heat dissipation and cooling efficiency, safety of the battery against expansion and explosion thereof can be improved, and thus a battery lifetime can be increased.

In addition, since the gap between the lower end of the battery cell 10 and the upper surface of the cooling path member 30 is decreased, and a heat radiation area is optimized, an amount of the heat transfer agent 20 can be reduced, and thus a weight and a cost of a battery system can be decreased.

In addition, by forming the upper path member 33 of the cooling path member to be bent to protrude upward, a temperature difference between the inner cell 11 disposed at an inner side and the outer cell 12 disposed at an outer side can be reduced.

According to a cooling structure of a battery module for an electric vehicle of the present invention described above, there are the following effects.

By decreasing a gap between a lower end of a battery cell and an upper surface of a cooling path member to improve heat dissipation and cooling efficiency, safety of a battery against expansion and explosion thereof can be improved, and thus a battery lifetime can be increased.

In addition, since the gap between the lower end of the battery cell and the upper surface of the cooling path member is decreased, and a heat radiation area is optimized, an amount of a heat transfer agent can be decreased, and thus a weight and a cost of a battery system can be decreased.

In addition, by forming an upper path member of the cooling path member to be bent to protrude upward, a temperature difference between an inner cell disposed at an inner side and an outer cell disposed at an outer side can be reduced.

The cooling structure of a battery module for an electric vehicle according to the present invention is not limited to the above-described embodiment and may be variously modified and implemented within a range in which the technical spirit of the present invention allows.

What is claimed is:

1. A cooling structure of a battery module for an electric vehicle, the cooling structure comprising:
    a battery cell;
    a heat transfer agent disposed under the battery cell;
    a cooling path member disposed under the heat transfer agent to be in contact with the heat transfer agent; and
    a cover member covering the battery cell,
    wherein a lower portion of the battery cell is in direct contact with the heat transfer agent,
    wherein the cover member is formed so that an entire lower portion of the cover member is open,
    the battery cell and the heat transfer agent are disposed inside the cover member, and
    a lower end of the cover member is in contact with an upper surface of the cooling path member.

2. The cooling structure of claim 1, wherein the battery cell is connected to the cooling path member through the heat transfer agent.

3. A cooling structure of a battery module for an electric vehicle, the cooling structure comprising:
    a battery cell;
    a heat transfer agent disposed under the battery cell;
    a cooling path member disposed under the heat transfer agent to be in contact with the heat transfer agent; and
    a cover member covering the battery cell,
    wherein the cooling path member includes an upper path member disposed under the battery cell, inside the cover member, and
    wherein the cover member is formed so that an entire lower portion of the cover member is open.

4. The cooling structure of claim 3, wherein:
an upper surface of the heat transfer agent is in contact with a lower portion of the battery cell; and
a lower surface of the heat transfer agent is in contact with an upper portion of the upper path member.

5. The cooling structure of claim 4, wherein:
the battery cell, the heat transfer agent, and the upper path member are disposed inside the cover member.

6. The cooling structure of claim 5, wherein the cooling path member further includes:
a lower path member having an upper surface in contact with a lower end of the cover member; and
an inclined portion inclined upward from the lower path member,
wherein the upper path member is disposed above the lower path member and the inclined portion to be in contact with the heat transfer agent, and
wherein the inclined portion and the upper path member are disposed inside the cover member.

7. The cooling structure of claim 6, wherein the inclined portion has an inclination angle in a range of 140 degrees to 160 degrees with respect to the lower path member, and an inclination angle in a range of 140 degrees to 160 degrees with respect to the upper path member.

8. The cooling structure of claim 3, wherein an entire length of the heat transfer agent in a horizontal direction is shorter than an entire length of the battery cell in the horizontal direction.

9. The cooling structure of claim 8, wherein the battery cell includes:
inner cells; and
outer cells disposed outside the inner cells,
wherein each of the outer cells includes an inner part in contact with a respective inner cell, among the inner cells, and an outer part facing the cover member, and
wherein the heat transfer agent is in contact with a lower portion of each of the inner cells and a lower portion of the inner part of each of the outer cells, and is not in contact with a lower portion of the outer part each of the outer cells.

10. The cooling structure of claim 9, wherein the lower portion of the outer part of each of the outer cells is spaced apart from an upper surface of the cooling path member.

11. The cooling structure of claim 10, wherein the cooling path member further includes:
a lower path member having an upper surface is in contact with a lower end of the cover member; and
an inclined portion inclined upward from the lower path member,
wherein the upper path member is disposed above the lower path member and the inclined portion to be in contact with the heat transfer agent,
wherein the inclined portion and the upper path member are disposed inside the cover member, and
wherein the outer part of an outer cell, among the outer cells, faces the inclined portion in a state in which the outer part of the outer cell is upwardly spaced apart from the inclined portion.

12. The cooling structure of claim 10, wherein a length of the outer part of an outer cell, among the outer cells, in a horizontal direction is 13% to 61% of an entire width of the outer cell.

* * * * *